United States Patent [19]

Vogel et al.

[11] Patent Number: 5,496,166
[45] Date of Patent: Mar. 5, 1996

[54] HIGHLY ACCURATE POSITION ADJUSTMENT MECHANISM FOR THE MOLD SECTIONS OF AN INJECTION STRETCH BLOW MOLDING MACHINE

[75] Inventors: Matthew T. Vogel, Lee's Summit; David H. Wescoat, Peculiar, both of Mo.; Ronald W. Chaffin, Hot Springs, Ark.

[73] Assignee: R & D Tool and Engineering, Inc., Lee's Summit, Mo.

[21] Appl. No.: 295,617

[22] Filed: Aug. 25, 1994

[51] Int. Cl.⁶ .................................................. B29C 45/04
[52] U.S. Cl. ........................................ 425/451; 425/533
[58] Field of Search ................................. 425/451, 529, 425/533, 541

[56] References Cited

U.S. PATENT DOCUMENTS

| | | | |
|---|---|---|---|
| 3,843,286 | 10/1974 | Horberg, Jr. et al. | 425/541 |
| 3,993,427 | 11/1976 | Kauffman et al. | 425/529 |
| 4,244,913 | 1/1981 | Ryder | 264/348 |
| 4,421,472 | 12/1983 | Martin, Jr. | 425/451 |
| 4,468,368 | 8/1984 | Hafele | 425/451 |
| 4,571,171 | 2/1986 | Blank et al. | 425/533 |
| 4,790,741 | 12/1988 | Takakusaki et al. | 425/526 |
| 5,340,302 | 8/1994 | Ingram | 425/541 |

*Primary Examiner*—Robert J. Warden
*Assistant Examiner*—Theresa T. Snider
*Attorney, Agent, or Firm*—Hovey, Williams, Timmons & Collins

[57] ABSTRACT

A mold section carrier assembly is provided for use in an injection stretch blow molding machine. The assembly permits highly accurate position adjustment of mold sections on the platens of the machine, and includes a back plate on which each mold section is secured, and a pair of side rails secured on opposite sides of the mold section on each back plate. A block is provided for each side rail, and includes a planer engagement surface that is parallel to and bears against an engagement surface of the rail. A force transmitting mechanism moves each block relative to the corresponding side rail in a direction that is angled relative to the engagement surfaces in order to adjust the position of the mold section relative to the platen within a plane transverse to the support surface of the machine.

16 Claims, 4 Drawing Sheets

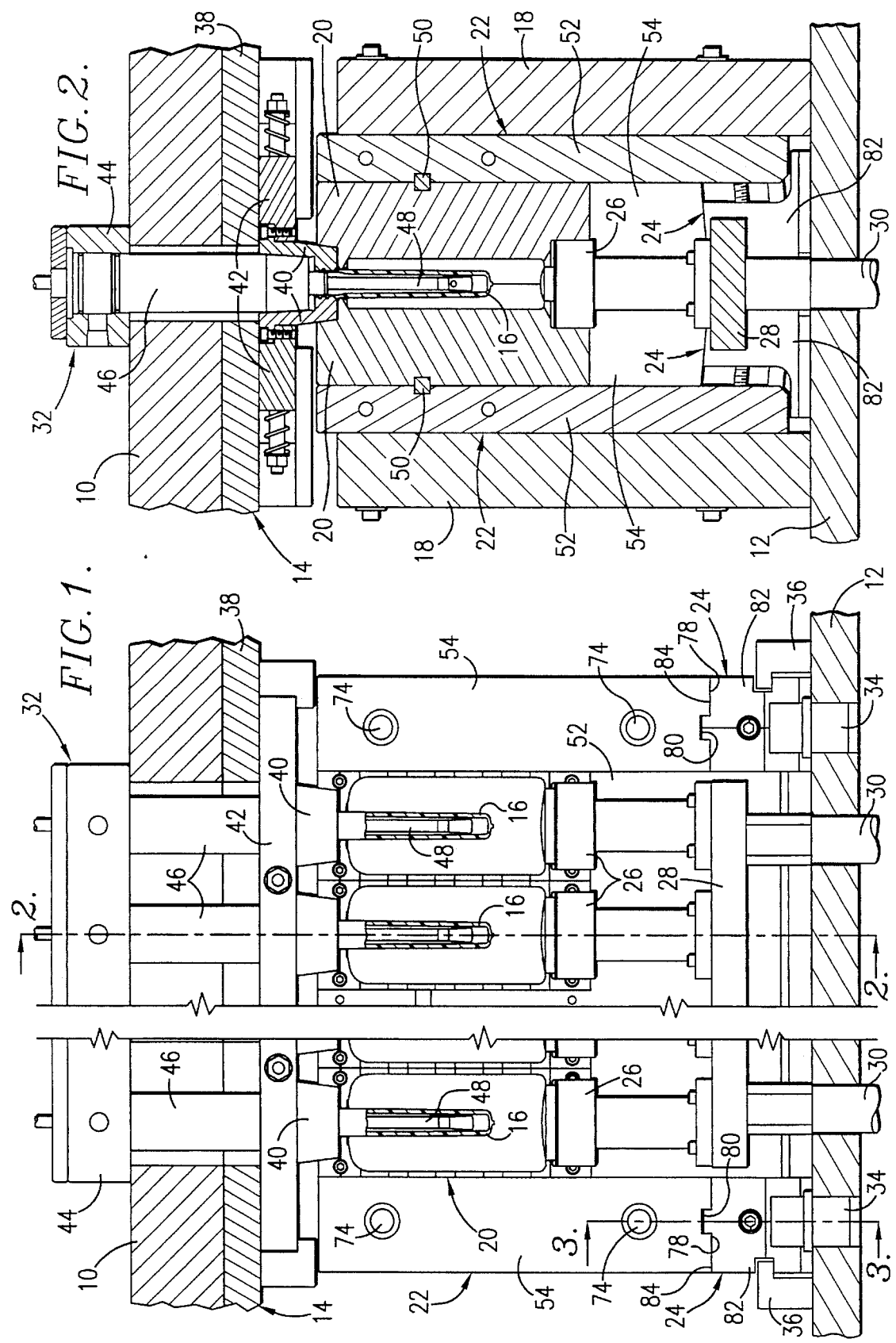

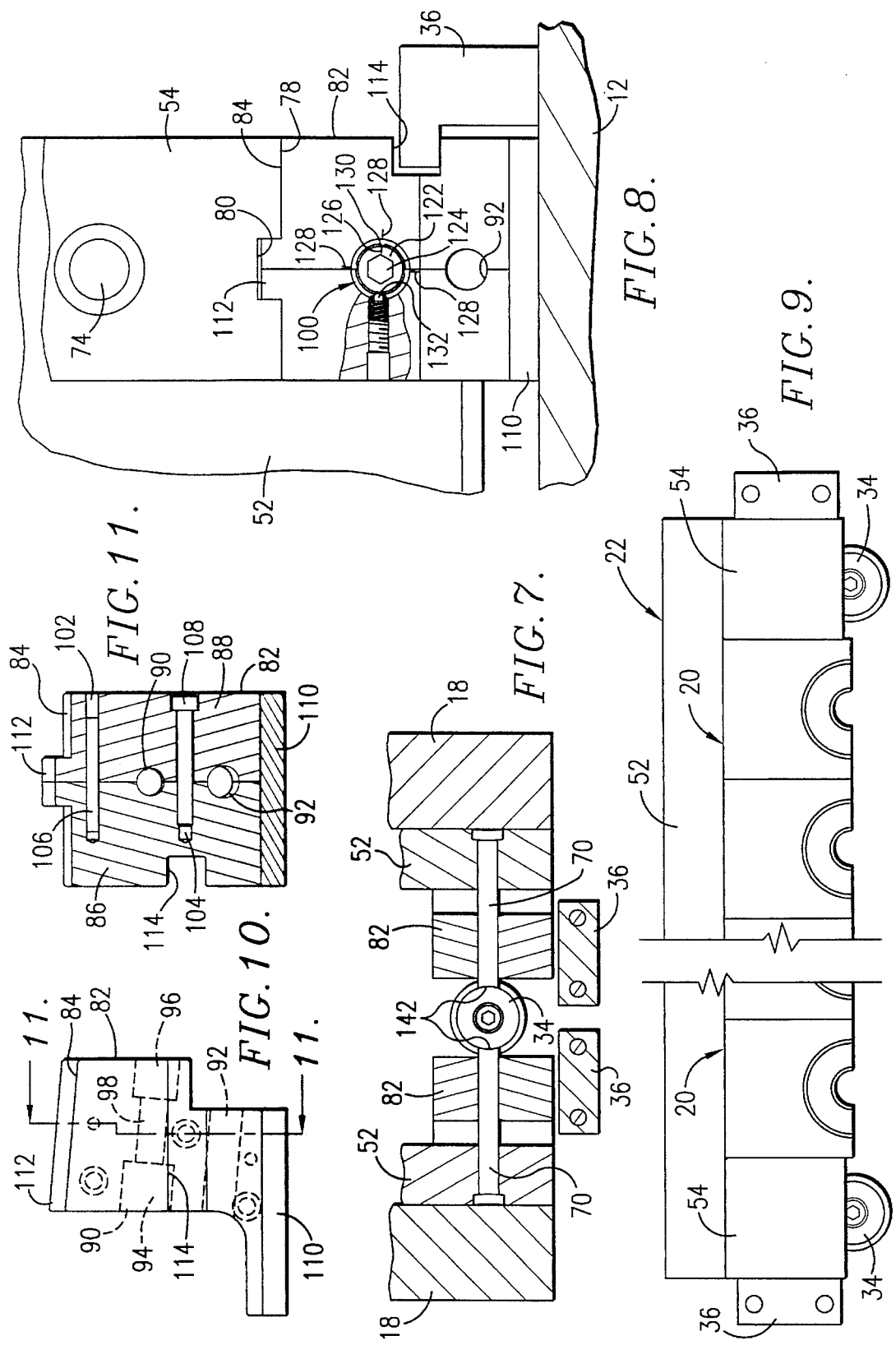

HIGHLY ACCURATE POSITION ADJUSTMENT MECHANISM FOR THE MOLD SECTIONS OF AN INJECTION STRETCH BLOW MOLDING MACHINE

BACKGROUND OF THE INVENTION

1. Field of the Invention

The present invention relates generally to the field of injection stretch blow molding machines and, more particularly, to a mechanism for accurately adjusting the position of the blow mold sections on such a machine.

2. Discussion of the Prior Art

Conventional stretch blow molding machines have an elongated blow core that is inserted a short distance into the open mouth of a preform at the blow station for the purpose of then injecting a surge of high pressure air into the warmed and softened body of the preform to stretch it quickly into the recesses of a mold cavity defined by blow mold sections encapsulating the preform. A stretch rod normally associated with the core also moves through a quick stretching stroke to mechanically engage and stretch the body of the preform in cooperation with the air charge during the blow cycle. The blow core and stretch rod are then withdrawn, the mold sections are retracted, and the finished product is removed from the blow station.

A pair of thread splits support the preform and position it at the blow station as the pair of blow mold sections are brought together around the preform and engage the splits. A push-up plate assembly underlies the station, and is moved upward as the mold sections are brought together, defining a bottom end of the mold cavity. Typically, the mold sections are supported on separate platens that are moved toward and away from one another to enclose the preform prior to a stretch blow molding operation, and to release the finished molded product.

Each mold section is supported on a platen by a back plate to which the mold is secured. The back plate, in turn, is secured to the platen by threaded fasteners or the like. Accurate measurements must be made at the time the back plates are secured to the platens to insure that the mold elements are aligned with the thread splits. If the mold sections are out of alignment even slightly, numerous problems may arise.

For example, such misalignment can cause too much load to be exerted on the splits by the mold sections, causing the splits to stick to the mold sections as the sections are separated from one another upon completion of a molding operation. When the splits come free of the mold sections, they snap back against the molded product, frequently damaging it. Further, variations between the stack dimensions of different stretch blow molding machines can result in misalignment between the thread splits of the machines and the mold sections.

When mold sections are misaligned relative to the thread splits, through wear, improper set-up, or any other reason, it is necessary to remove the back plates from the platens, and to modify the plates before resecuring them to the platens. For example, in order to raise the mold elements, shims may be positioned beneath side rails of the back plates. Alternately, to lower the sections, wear pads provided on the back plates may be ground. Other ways of conventionally adjusting the position of the mold sections include machining the top of the mold or adjusting the position of the sections on the back plates.

Because of the size of many molds, some of which include mold sections for forming several bottles at a time, it is frequently necessary to employ a crane for moving the back plates and mold sections between the platens and a work bench at which such machining or refitting may be done. Thus, such adjustments are expensive, time consuming, and place the mold sections, many of which are highly polished, at risk of being damaged.

OBJECTS AND SUMMARY OF THE INVENTION

It is an object of the present invention to provide an injection stretch blow molding machine in which the position of mold sections can be easily adjusted very accurately.

It is another object of the present invention to provide a mold section carrier assembly that permits adjustment of the assembly in a molding machine without requiring removal of the assembly or expensive refitting.

Yet another object of the invention is to provide a means for adjusting the finished height of the molded bottles without requiring time consuming and expensive modifications to the mold sections.

In accordance with these and other objects evident from the following description of a preferred embodiment of the invention, a mold section carrier assembly is provided for use with an injection stretch blow molding machine having a base defining a planer support surface, and a platen movable relative to the base in a direction parallel to the support surface.

The assembly supports the mold section for movement with the platen, and presents a planer engagement surface that is angled relative to the support surface. An adjustment means is provided for adjusting the position of the mold section relative to the platen within a plane transverse to the support surface, the adjustment means including a block supported for movement relative to the platen. The block includes a planer engagement surface that is parallel to and bears against the engagement surface of the carrier means. A force transmitting means moves the block relative to the mold section in a direction that is angled relative to the engagement surfaces.

Preferably, the assembly includes a back plate on which the mold section is secured, and a pair of side rails secured to the back plate on opposite sides of the mold section, each of the side rails presenting an engagement surface. A pair of blocks are supported on the back plate for movement relative to the side rails. Each of the blocks includes a planer engagement surface that is parallel to and bears against the engagement surface presented by the corresponding side rail. The force transmitting means moves each block relative to the corresponding side rail in a direction that is angled relative to the engagement surfaces. Further, a means is provided for securing the carrier assembly to the platen once the position of the mold section has been adjusted.

By providing a construction in accordance with the present invention, numerous advantages are obtained. For example, by providing an adjustment means for adjusting the position of the mold sections relative to the platens, it is possible to accurately adjust and readjust the position of the mold sections relative to the thread splits so that the mold sections are always in proper alignment at the blow station. This feature of the invention also allows adjustment of the finished bottle height by enabling the clearance between the thread splits and mold sections to be adjusted to accomplish the desired height adjustment.

As a further result of this feature of the invention, set-up of the machine is expedited, and it is possible to adjust or compensate for any misalignment between the mold sections and thread splits while the back plates remain on the machine. No cranes are necessary, and the time for making such adjustments is significantly reduced.

BRIEF DESCRIPTION OF THE DRAWING FIGURES

The preferred embodiment is described in detail below with reference to the attached drawing figures, wherein:

FIG. 1 is a sectional view, taken along a vertical plane, of a stretch blow molding machine, illustrating a mold section carrier assembly constructed in accordance with the preferred embodiment;

FIG. 2 is a sectional view of the machine, taken along line 2—2 of FIG. 1;

FIG. 7 is a fragmentary sectional view, taken along a horizontal plane, of various components of the assembly used to position the assembly during a stretch blow molding operation;

FIG. 8 is a fragmentary view of FIG. 1, partially in section, of a detent mechanism forming a part of the assembly;

FIG. 9 is a fragmentary top plan view of the assembly;

FIG. 10 is a side elevational view of an adjustment block forming a part of the assembly; and FIG. 11 is a sectional view taken along line 11—11 of FIG. 10.

DETAILED DESCRIPTION OF THE PREFERRED EMBODIMENT

Figure 3:
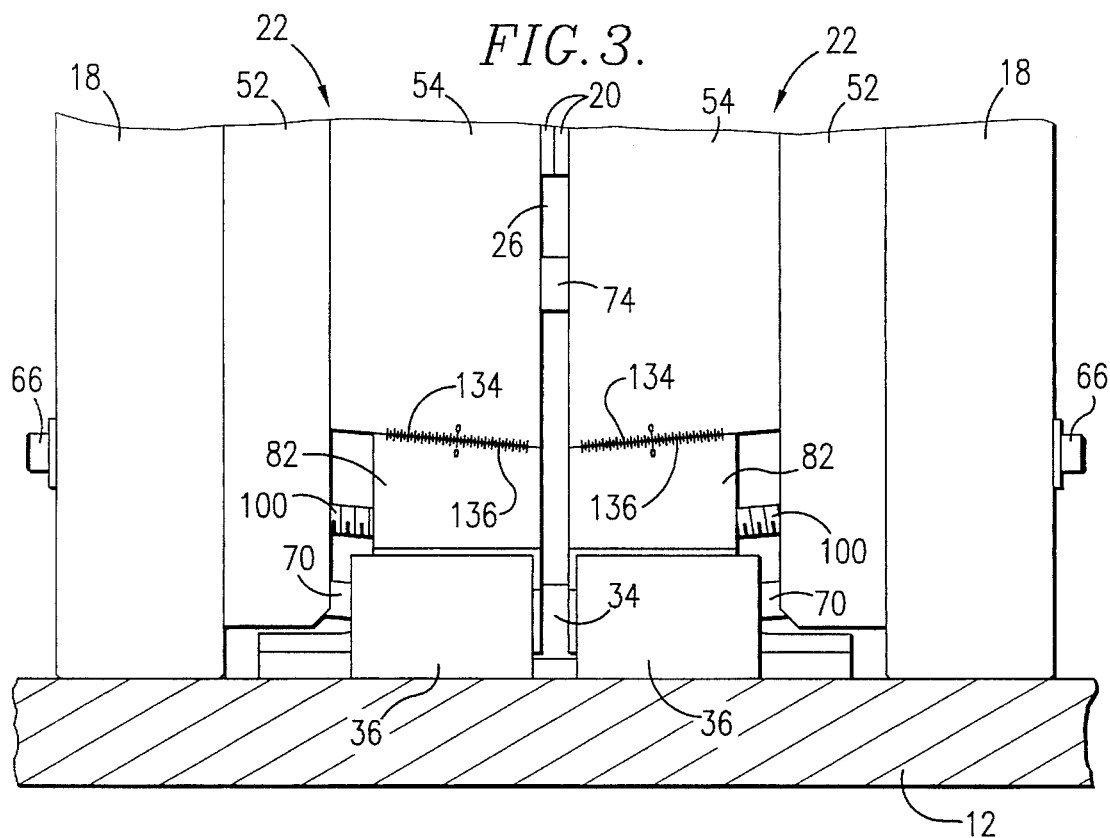
FIG. 3 is a side elevational view of the mold section carrier assembly.

The blow station of an injection stretch blow molding machine is illustrated in FIG. 2, and broadly includes a frame 10 supported on a base 12. A rotation plate assembly 14 is supported for movement relative to the frame for carrying one or more preforms 16 to the blow station, and to remove molded products such as bottles therefrom.

The machine also includes a pair of platens 18 supported above the base for reciprocating horizontal movement between a closed position, as shown in FIG. 2, and an open position in which the platens are moved apart from one another. Preferably, a fluid actuated cylinder assembly is provided for each platen for carrying out this platen movement. Further, the base defines an upper support surface which guides the platens during movement toward and away from one another.

A mold section 20 is supported on each platen by a carrier assembly 22, and these sections are brought together in the closed position of the platens to define a cavity surrounding the preform. An adjustment means 24 is provided for each carrier assembly for adjusting the position of each mold section relative to the corresponding platen within a plane transverse to the support surface.

One or more push-ups 26 are provided on a push-up plate 28 of a push-up plate assembly supported for axial vertical movement by a pair of cylinder assemblies 30, illustrated in FIG. 1. Each push-up 26 fits between the mold sections 20 within each mold cavity, and defines a bottom surface of the mold cavity in the closed position of the platens 18.

A blow core assembly 32 is supported along the frame 10 for relative vertical movement between a lowered position as shown in FIGS. 1 and 2, and a raised position in which it is lifted above the rotation plate assembly 14.

Turning to FIG. 1, the base 12 is illustrated as including a pair of upstanding plugs 34 which function as stops for positioning the mold sections 20 at the blow station in the closed position of the platens. A pair of L-shaped gibs 36 are also provided on the base in association with each platen, and guide movement of the platens during operation of the machine.

The rotation plate assembly 14 is shown in FIG. 2, and includes a rotation plate 38 that moves relative to the frame, and at least one pair of thread splits 40 that are supported on the rotation plate by a pair of spring-biased slide members 42. The thread splits 40 of each pair are held together by the slide members 42 during transportation to the blow station, and are retained in proper alignment with one another by the mold sections 20 when the platens are in the closed position. Typically, as shown in FIG. 1, a separate pair of thread splits is provided for each cavity defined by the mold sections.

The blow core assembly 32 includes a transport member 44 on which at least one blow core body 46 is supported. The number of blow core bodies 46 corresponds to the number of cavities defined by the mold sections, and each body is aligned with one of the preforms 16 provided at the blow station on the rotation plate assembly 14. Each blow core body includes a stretch rod 48, and suitable air supply means for injecting a surge of high pressure air into the warmed and softened body of the preform to stretch it quickly into the recesses of a mold cavity defined by the mold sections.

During a stretch blow molding operation, the stretch rods 48 move through a quick stretching stroke to mechanically engage and stretch the bodies of the preforms in cooperation with the air charge during the blow cycle. The blow core assembly is then withdrawn, the mold sections are retracted, and the finished product is removed from the blow station by the rotation plate assembly.

Each mold section 20 presents one or more cavities within which bottles or other products are formed, and includes a plurality of holes extending through the mold section from front to back for permitting attachment of the section to the carrier assembly. As shown in FIG. 2, a keyway may be formed in the rear surface of each mold section which is aligned with a cooperating keyway of the carrier assembly, and a key 50 is provided for retaining each section in place.

As shown in FIG. 9, each carrier assembly 22 includes a back plate 52 and a pair of side rails 54. Each back plate 52 is preferably a large flat plate, as shown in FIG. 2, presenting opposed front and rear planer surfaces. Holes are formed in the back plate for alignment with the holes formed in the corresponding mold section in order to permit the section to be secured to the back plate.

Figure 4:
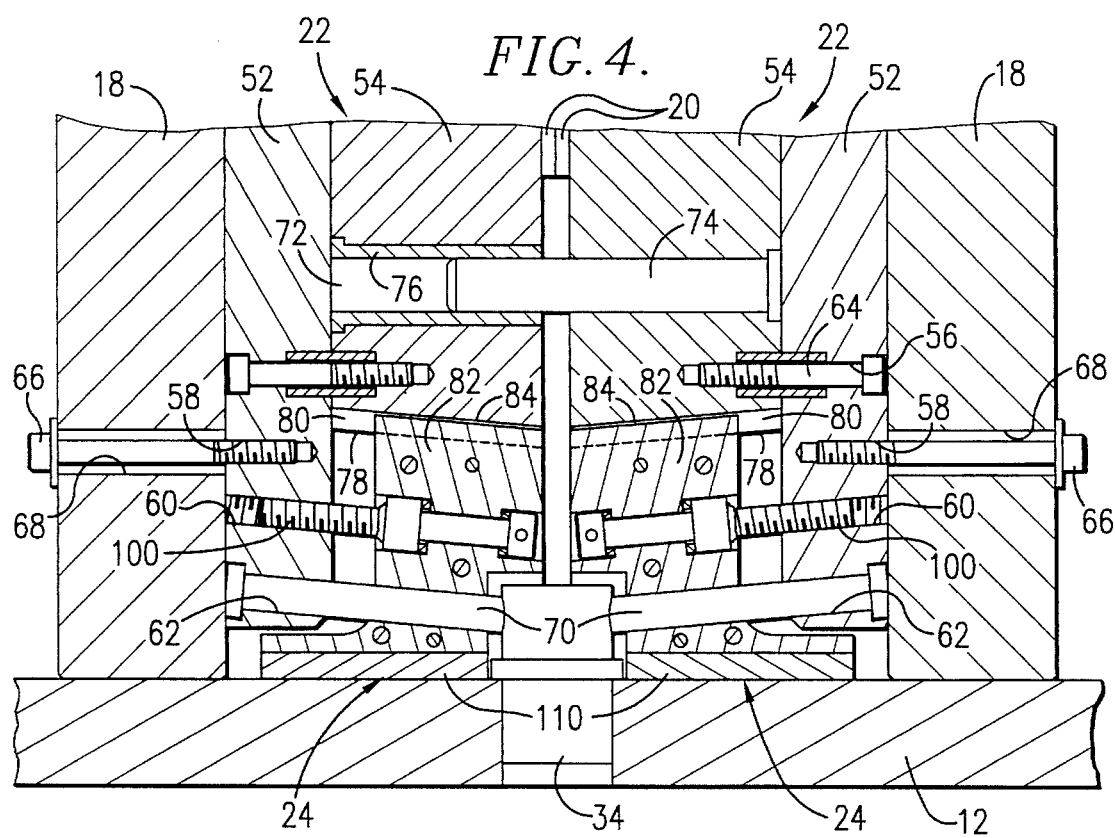
FIG. 4 is a sectional view taken along line 4—4 of FIG. 1.

In addition, as shown in FIG. 4, the back plate is provided with four holes 56, 58, 60, 62 adjacent each bottom corner thereof. The uppermost holes 56 are adapted to receive threaded fasteners 64 for securing the side rails 54 to the back plate, and each hole 56 includes large diameter sections formed on either side of a central, small diameter section. The next lowest holes 58 are threaded to receive fasteners 66 used to secure the carrier assembly to the corresponding platen. Each platen includes oversized holes 68 aligned with each of the holes 58 for receiving the fasteners 66, wherein the oversized holes permit a limited range of movement of the carrier assembly relative to the platen when the fasteners 66 are loosened.

The next lowest holes 60 are threaded, and extend through the back plate at a slight angle to the support surface. As described below, the adjustment means is secured to the back plate at these holes 60. The lowest holes 62 formed in the bottom corners of each platen are also angled slightly relative to the support surface, and are adapted to receive locating pins 70 that are used to bear against the upstanding plugs on the base and position the mold sections in the closed position of the platens. The holes 60, 62 are parallel to one another.

The side rails are secured to the back plates by the threaded fasteners 64 provided in the holes 56 of the back plate and received in threaded holes formed in the rear faces of the side rails. The front surfaces of the rails on one of the platens are provided with a pair of holes 72 that are aligned with pins 74 provided on the two rails on the other platen. When the platens are moved to the closed position, the pins 74 engage the holes 72 to position and support the mold sections relative to one another during a stretch blow molding operation. A wear sleeve 76 is provided within each of the holes for reducing wear of the hole surface.

Each rail presents a lower surface 78 that is spaced vertically from the support surface and angled by an angle equal to the angle of the holes 60, 62 in the back plate. Preferably, as shown in FIG. 1, the lower surface 78 of each rail also includes a central slot 80. The slot is illustrated in FIG. 4, and presents a bottom surface parallel to the remainder of the lower surface of the rail, and a pair of side walls. The lower surface 78 of each rail defines an engagement surface that is engaged by the adjustment means to adjust the position of the carrier assembly and mold sections relative to the corresponding platen.

As shown in FIG. 1, the adjustment means 24 includes a separate adjustment assembly positioned beneath each side rail 54. Each adjustment assembly includes a block 82 having a lower bearing surface parallel to the support surface, and an upper engagement surface 84 adapted to engage the engagement surface 78 of one of the side rails. As shown in FIG. 11, the block 82 is preferably formed of two side-by-side halves 86, 88, and includes two holes 90, 92 extending through the block between the halves.

As shown in FIG. 10, the upper hole 90 includes axially outer, large diameter sections 94, 96 on either side of a central small diameter section 98, and is adapted to receive a threaded adjustment screw 100, shown in FIG. 4, that extends through the block 82 into the threaded hole 60 of the corresponding back plate. The lower hole 92 is sized for receipt of the locating pin 70, and permits the pin to slide axially relative to the block.

Returning to FIG. 11, a plurality of holes 102, 104 extend between the block halves in a direction transverse to the holes 90 92, and receive either pins 106 or threaded fasteners 108 for holding the block halves together. A bronze wear pad 110 or the like is provided on the bottom bearing surface of the block, and is adapted to rest on the support surface during use of the machine. The upper engagement surface 84 of the block is provided with an upstanding ridge 112 adapted for sliding receipt in the slot of the side rail, and the ridge presents side walls which bear against the side walls of the slot to prevent the block from moving laterally of the slot.

Each block 82 includes a groove 114 formed in one side wall thereof and extending in a direction parallel to the support surface. This groove is adapted to receive one of the gibs 36, as shown in FIG. 8. In addition, as shown in FIG. 10, the front wall of each block is recessed along the lower edge thereof so that the block does not interfere with the plugs when the platens are moved to the closed position shown in FIG. 4.

Figure 5:
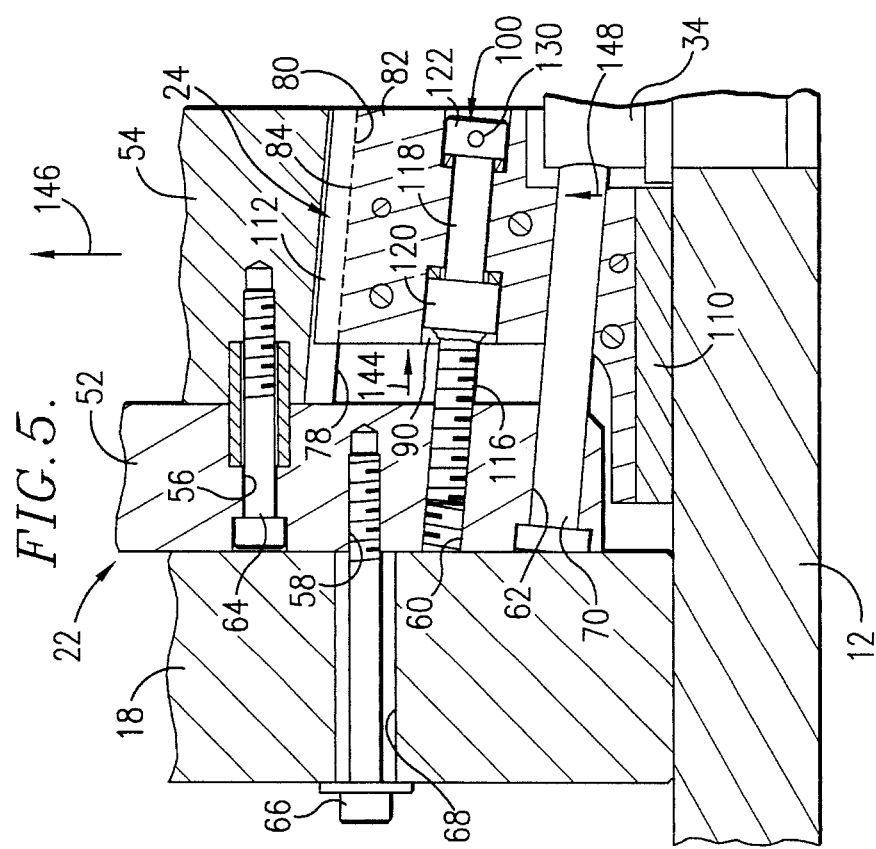
FIG. 5 is a fragmentary view of FIG. 4, illustrating the direction of movement of various assembly components during adjustment of the assembly on the machine.

The adjustment screw 100 is shown in FIG. 5, and includes two axial sections 116, 118 spaced from one another on either side of an annular collar 120. One of the sections 116 is threaded, and is received in the threaded hole 60 of the back plate so that rotational movement of the screw causes the screw to move into or out of the hole. The other section 118 of the screw is provided with a smooth outer surface, and extends between the collar and a head 122 provided at an end of the screw.

The adjustment screw is positioned between the block halves during assembly, and is retained axially on the block by the head 122 and collar 120, which are received within the large diameter sections of the hole 90. Thrust washers are fitted on the smooth section 118 of the screw adjacent the head and collar, and function as bearings which permit free rotation of the screw relative to the block while restraining axial movement of the screw. As shown in FIG. 8, a socket 124 is formed in the end of the head for permitting rotation of the screw through the use of a tool.

An indicium 126 is formed on the end face of the head for indicating the rotational position thereof, and additional indicia 128 are formed in the block around the hole for reference. Preferably, the head includes indentations 130 around the circumference thereof, and a spring-biased ball or detent 132 extends into the hole at a point along the circumference of the large diameter section within which the head is received. The detent 132 provides stepped rotation of the screw relative to the block through a plurality of rotational positions, and provides an audible click each time one of the stepped positions is reached.

Turning to FIG. 3, a scale 134 is provided along the side of each side rail adjacent the lower engagement surface. An identical scale 136 is formed on each block adjacent the upper engagement surface, and the two scales face one another to provide a gauge for measuring the position of the block relative to the side rail. By providing one of these gauges between the carrier assemblies and each adjustment assembly, it is possible to insure that the same adjustment is made to each side of both mold sections so that the sections are moved an equal distance relative to the thread splits.

Figure 6:
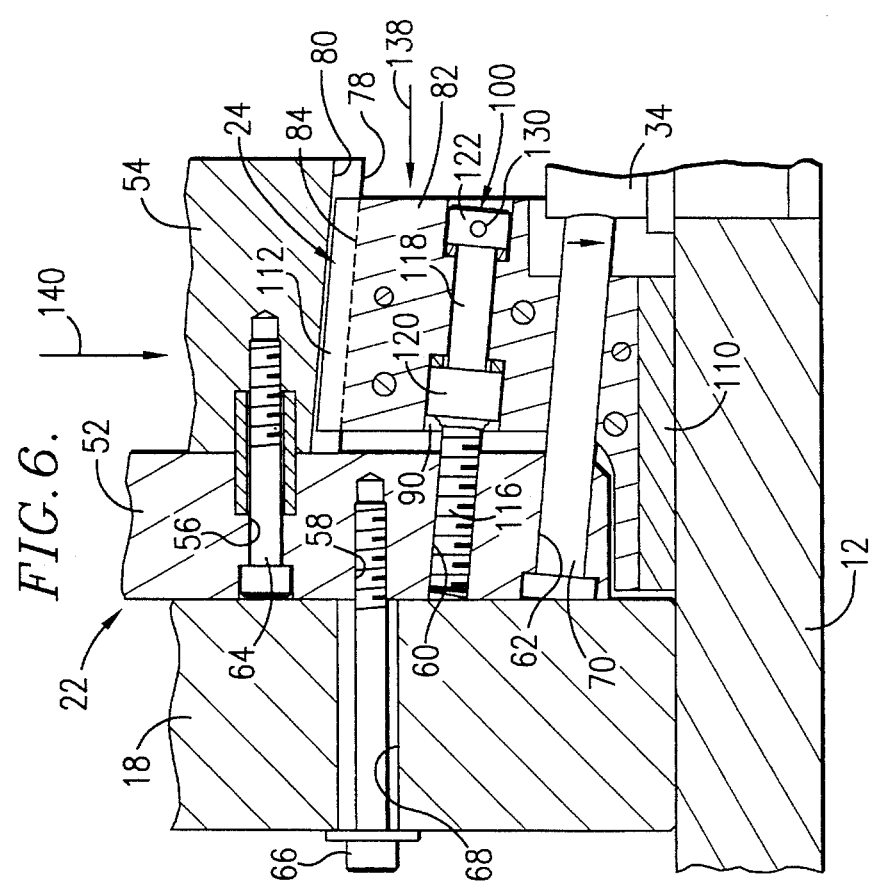
FIG. 6 is a fragmentary view of FIG. 4, illustrating the direction of movement of various assembly components during an alternate adjustment of the assembly on the machine.

Operation of the adjustment means is illustrated in FIGS. 5 and 6, wherein a lowering adjustment of one side of a mold section and carrier assembly relative to the platen is shown in FIG. 5, and a raising adjustment is illustrated in FIG. 6. Turning first to FIG. 5, downward adjustment is achieved by rotating the adjustment screw 100 in a clockwise direction which threads the screw into the back plate 52.

This axial movement of the screw pulls the block 82 toward the back plate, in the direction of the arrow 138, causing relative shifting movement between the engagement surfaces and between the wear pad and the support surface. This movement of the block allows the carrier assembly to drop vertically in the direction of the arrow 140 so that the side of the mold section is lowered relative to the platen. This same adjustment is then carried out on each of the remaining adjustment assemblies to move the mold sections down by the desired amount.

The locating pins 70 supported on the back plate drop with the plate, and present outer ends 142 that are curved about a vertical axis, as shown in FIG. 7, to receive the outer surface of the plug, regardless of the height at which the pin engages the plug. Thus, vertical movement of the carrier assembly does not effect the horizontal position of the platens in the closed position. This important feature of the construction preserves the horizontal relationships between the mold sections on the machine, while allowing adjustment vertically relative to the thread splits.

As shown in FIG. 6, upward adjustment of a mold section is accomplished by rotating the adjustment screws 100 of each adjustment assembly on the corresponding carrier assembly in the counterclockwise direction such that the blocks 82 are pushed away from the back plate 52 in the direction of the arrow 144. This movement causes relative shifting between the engagement surfaces such that the side rails are lifted higher onto the block, and the carrier assembly is moved upward in the direction of the arrow 146. At the same time, the locator pin is also moved vertically upward in the direction of the arrow 148.

As mentioned, the scale 136 provided on each block provides a gage for measuring the position of the block relative to the side rail so that the same adjustment may be made to each side of both mold sections. However, it may be desired in certain instances to adjust one side of a mold section relative to the other side of the same section. For example, if the support surface has worn more significantly on one side of the platen than on the other, it may be desirable to adjust one adjustment means relative to the other in order to obtain a true horizontal orientation of the mold assembly. Thus, the adjustment assemblies at each end of each mold section are adapted to be used either together when changing the vertical position of the mold assembly, or separately from one another to adjust the angular orientation of the mold assembly.

Once the adjustment means has been used to position each end of each mold section in the desired position, the threaded fasteners 66 holding the carrier assemblies to the platens are tightened to secure the mold sections and carrier assemblies in place. Thereafter, operation of the machine is conducted in a conventional manner. If further adjustments are necessary, it is only necessary to loosen the threaded fasteners 66 and make the necessary changes. It is not necessary to completely remove the carrier assemblies from the platens in order to adjust the mounted positions of the carrier assemblies.

Although the present invention has been described with reference to the preferred embodiment illustrated in the attached drawing figures, it is noted that substitutions may be made and equivalents employed herein without departing from the scope of the invention as recited in the claims.

What is claimed is:

1. In an injection stretch blow molding machine having a base defining a planer support surface, a platen movable relative to the base in a direction parallel to the support surface and a mold section supported for movement with the platen, the improvement comprising:

a carrier means for supporting the mold section for movement with the platen, the carrier means presenting a planer engagement surface that is angled relative to the support surface; and an adjustment means for adjusting the position of the mold section relative to the platen within a plane transverse to the support surface, the adjustment means including a block supported for movement relative to the platen, the block presenting a planer engagement surface parallel to and bearing against the engagement surface of the carrier means, and a force transmitting means for moving the block relative to the mold section in a direction that is angled relative to the engagement surfaces.

2. A combination as recited in claim 1, wherein the carrier means includes a back plate on which the mold is secured, and a side rail secured to the back plate on each side of the mold section, the combination further comprising a means for securing the back plate to the platen once the position of the mold section has been adjusted.

3. A combination as recited in claim 2, wherein the base includes an upstanding reference element for positioning the mold section during an injection stretch molding operation, the combination further comprising a locating means for locating the carrier means relative to the reference element.

4. A combination as recited in claim 2, wherein a separate adjustment means is provided for each side rail and each adjustment means includes a block interposed between the base and one of the side rails for movement relative to the side rail, the side rails each including a planer engagement surface parallel to and bearing against the engagement surface of the corresponding block.

5. A combination as recited in claim 4, wherein each block presents a lower bearing surface that is parallel to and rests on the support surface, the carrier means being supported on the base by the blocks.

6. A combination as recited in claim 5, further comprising a wear pad supported on the lower bearing surface of each block and interposed between the block and the base.

7. A combination as recited in claim 4, wherein the back plate includes a threaded tap beneath each side rail, and the force transmitting means of each adjustment means includes a threaded adjustment screw supported on the corresponding block for relative rotation and received in one of the threaded taps so that rotation of the screw forces the block toward or away from the back plate, depending upon the direction of rotation.

8. A combination as recited in claim 7, wherein each adjustment means includes an indicium on the screw and an indicium on the block adjacent the screw so that the rotational position of the screw relative to the block is indicated.

9. A combination as recited in claim 7, wherein each adjustment means includes a detent means interposed between the block and the screw for providing stepped rotation of the screw relative to the block through a plurality of rotational positions.

10. A combination as recited in claim 4, wherein each block includes a side wall, and each side rail includes a side wall generally coplaner with the side wall of the corresponding block, the combination further comprising a plurality of indicia formed on the side walls along the line at which the side walls intersect so that the position of the block is indicated.

11. A combination as recited in claim 4, wherein the base includes upstanding reference elements for positioning the mold section during an injection stretch molding operation, the combination further comprising a pair of locating pins secured to the back plate for locating the back plate relative to the reference elements, each pin extending through one of the blocks and presenting a free end that engages one of the reference elements when the mold section is in position for a stretch blow molding operation.

12. A mold section carrier assembly for supporting a mold section on a platen of a molding machine, the assembly comprising:

a back plate on which the mold section is secured;

a pair of side rails secured to the back plate on opposite sides of the mold section, each of the side rails presenting an engagement surface;

a pair of blocks supported on the back plate for movement relative to the side rails, each of the blocks including a planer engagement surface that is parallel to and bears against the engagement surface presented by the corresponding side rail;

a force transmitting means for moving each block relative to the corresponding side rail in a direction that is angled relative to the engagement surfaces; and a means for securing the carrier assembly to the platen once the position of the mold section has been adjusted.

13. A combination as recited in claim 12, wherein the back plate includes a threaded tap beneath each side rail, and each force transmitting means includes a threaded adjustment screw supported on the corresponding block for relative rotation and received in one of the threaded taps so that rotation of the screw forces the block toward or away from the carrier assembly, depending upon the direction of rotation.

14. A combination as recited in claim 13, further comprising an indicium on the screw and an indicium on the block adjacent the screw so that the rotational position of the screw relative to the block is indicated.

15. A combination as recited in claim 13, further comprising a detent means interposed between the block and the adjustment screw for providing stepped rotation of the screw relative to the block through a plurality of rotational positions.

16. A combination as recited in claim 12, wherein each block includes a side wall, and each side rail includes a side wall generally coplaner with the side wall of the corresponding block, the combination further comprising a plurality of indicia formed on the side walls along the line at which the side walls intersect so that the position of the block is indicated.

* * * * *